3,403,105
TRANSAXLE FLUID
Joseph M. Sandri, Chicago Heights, Ill., assignor to Standard Oil Company, Chicago, Ill., a corporation of Indiana
No Drawing. Original application Dec. 27, 1963, Ser. No. 334,018, now Patent No. 3,342,843. Divided and this application Jan. 25, 1967, Ser. No. 627,280
4 Claims. (Cl. 252—75)

ABSTRACT OF THE DISCLOSURE

Lubricating oil compositions consisting essentially of a petroleum base automatic transmission fluid and oil-soluble dithiophosphoryl derivatives of the allyl alcohol and 2-butane-1,4-diol adducts of hexachlorocyclopentadiene useful as transaxle lubricants.

---

This is a division of copending application, Ser. No. 334,018, filed Dec. 27, 1963, now Patent No. 3,342,843.

This invention relates to certain novel dithiophosphoryl derivatives of hexachlorocyclopentadiene-unsaturated alcohol adducts, and particularly to lubricant compositions containing such dithiophosphoryl derivatives.

The development of the automobile transaxle by the automotive industry has introduced special problems into automotive lubrication. The transaxle is a unit which combines the transmission and rear axle hypoid rear mechanisms in a single housing. The transmission unit can be either of the manual shift or hydraulically controlled automatic types. It is desirable for engineering and economic reasons to combine the transmission and rear axle units in such a manner that the same lubricant can be used for both of these mechanisms. However, there are substantial differences in the lubricant requirements between manually shifted and hydraulically controlled automatic transaxle types.

The conventional automobile automatic transmissions are hydraulic torque transmitting devices which require substantially different lubricants from those used in conventional automobile manual transmissions and differentials. The automatic transmission requires a fluid lubricant which is of relatively low viscosity that does not vary considerably over a wide temperature range and which is stable at relatively high temperatures. The hypoid gears of the differential have heretofore required extreme pressure additives in a fairly high viscosity lubricant. While conventional hypoid gear lubricants can be used as the single lubricant for manual shift transaxles, the automatic type transaxles require a lubricant that has all of the characteristics of an automatic transmission fluid plus the extreme pressure characteristics essential to satisfactory operation of hypoid gears. The present invention is therefore directed to the provision of means for producing an automatic transaxle fluid that will function as a single lubricant for the automatic transmission and hypoid gear units in the transaxle.

The essential problem in the development of a transaxle fluid is therefore the production of the desired extreme pressure characteristics in an automatic transmission fluid without impairing the characteristics and function of the automatic transmission fluid. Adding a conventional extreme pressure agent to an automatic transmission fluid does not solve the problem because conventional extreme pressure agents are usually corrosive and can also act as pro-oxidants. Furthermore, conventional extreme pressure agents generally are incompatible with automatic transmission fluids, clutch plates and seals. A satisfactory extreme pressure agent must have superior extreme pressure properties, be oxidation stable, thermally stable, non-corrosive, non-reactive and compatible with automatic transmission fluids, seals, and clutch plates. The reader is referred to Hunstad et al. paper (and the literature cited) on "Developing Transaxle Fluid," presented at the January 1960 annual meeting of the Society of Automotive Engineers, and published in SAE Transactions, vol. 68, 1960, pp. 685–698, for more detailed information with respect to lubricants for hypoid gears, automatic transmissions, and transaxles.

A new class of compounds, hereinafter described, has been discovered which when added to automatic transmission fluids in small amounts produce lubricating fluids suitable for service as a single lubricant in automatic type transaxles. These new compounds can be classified as extreme pressure agents that are soluble in and compatible with automatic transmission fluids, non-reactive, and have the ability to impart the requisite extreme pressure property to such fluids.

The new class of extreme pressure agents which have been found to possess the desired qualities described above are certain oil-soluble dithiophosphoryl derivatives of the allyl alcohol and 2-butene-1,4-diol adducts of hexachlorocyclopentadiene. These derivatives consist of compounds represented by formulas:

(A) 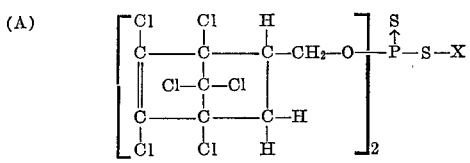

wherein X is a member of the group consisting of (a)
$$-\underset{\underset{CH_2-COOR}{|}}{CH-COOH}$$

(b) 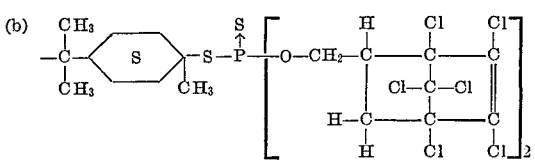

(c) 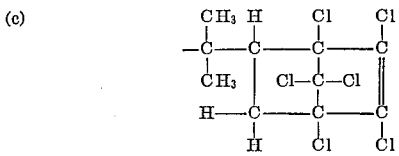

(d) 

and (e) 

(B) 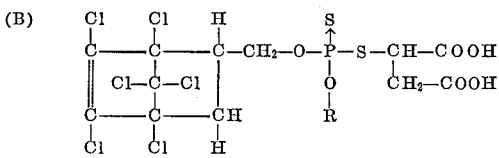

(C) 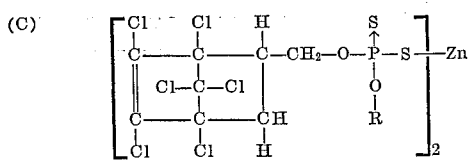

and (D) 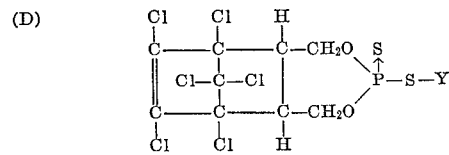

wherein Y is a member of the group consisting of (a) 

(b) 

and (c) 

wherein R in each instance is an alkyl group of at least 6 carbon atoms. The alkyl groups can be straight or branched chain of from 6 to about 20 carbon atoms.

The herein described derivatives can be employed in amounts of from about 0.1 to about 10%, preferably 3 to 6%, by weight, in automatic transmission fluids to form transaxle fluids suitable for use as the single lubricant for automatic transaxle units. The term "transaxle fluid" as used in the description and claims refers to lubricating fluids consisting essentially of an automatic transmission fluid and the new compounds of the present invention.

Automatic transmission fluids are well known in the art. Generally, they are petroleum base oils having a viscosity in the range of 35–100 SUS at 100° F. compounded with additives to provide the proper anti-oxidation, detergent, viscosity stability, viscosity index, pour point, clutch plate and seal compatibility, anti-rust, anti-squawk, anti-chatter, and anti-foam properties.

An automatic transmission fluid consisting essentially of:

(1) About 72.1 weight percent of a pertoleum base oil having a viscosity in the range of 35–100 SUS at 100° F.;

(2) About 3 weight percent of a polymethacrylate having an average viscosity of about 3700 SUS at 210° F.;

(3) About 17 weight percent of a polybutene having a mean molecular weight of about 1800 and an average viscosity of 15,000 SUS at 210° F.;

(4) About 6.8 weight percent of the oil-soluble reaction product prepared by the process comprising the steps of (a) Reacting a butene polymer having an average molecular weight of 800 with about 15.5 weight percent of $P_2S_5$ at a temperature of about 450° F. for about 5.5 hours, (b) Mixing the resultant reaction product with about 0.1 mole of polymeric linoleic acid having an average molecular weight of about 775, about 1.4 moles of boric acid, about 17.1 moles of methanol and about 1.6 moles of water and heating the resultant mixture at reflux temperature for about one hour, (c) Adding to said mixture about 0.7 mole of zinc oxide and continuing heating the mixture at reflux temperature for about two hours, (d) Adding to the partially neutralized reaction product thus obtained about 1.3 moles of barium oxide and continuing heating of the resultant mixture at reflux temperatures for about two hours, and (e) Then heating the resultant mixture to about 350° F. to remove said water and methanol therefrom;

(5) About 0.1 weight percent of calcium sulfonate;

(6) About 0.5 weight percent of tertiary-$C_{12-18}$ alkyl primary amine; and (7) About 0.5 weight percent of 2,6-di-t-butyl-4-methylphenol was prepared to demonstrate the present invention. This fluid will be referred to in the examples following as ATF lubricant.

In the following examples illustrating the present invention, the extreme pressure properties of the transaxle fluid was determined by the SAE Extreme Pressure Method at 14 to 1 gear ratio, 100 r.p.m., with automatic loading. Oxidation stability of the transaxle fluids was determined by the Oven Oxidation Stability Test. In this test 200 g. of the fluid is placed in a 400 ml. Griffith beaker. 10 inch lengths of 18 gauge copper wire and 20 gauge iron wire, each carefully polished with emery cloth and wound into approximately ½ inch diameter coils are placed in the fluid. The beaker is covered with a watch glass and stored in a thermostatically controlled oven at 275° F. for 100 hours. The sample is then removed and filtered thru fluted filter paper. Visual examination is made for sludge formation, and condition of the copper and iron wires and filter paper. Any sludge formation or excessive corrosion of the wires constitutes a fail.

EXAMPLE 1

A mixture of 546 g. (2 mol) hexachlorocyclopentadiene and 116 g. (2 mol) allyl alcohol was heated at 100–140° C. for 24 hours. The product was cooled and mixed with hexane, the crystals collected on a filter and dried. There were recovered 632 g. of white crystals of hexachloronorbornenylmethanol having a melting point of 163–165° C. and structure

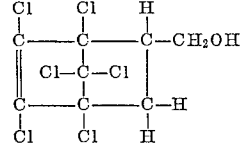

*Analysis.*—Calculated for $C_8H_6Cl_6O$: Cl, 64.3. Found: Cl, 64.3.

EXAMPLE 2

A mixture of 1986 g. (6 mol) of hexachloronorbornenylmethanol, 333 g. (1.5 mol) $P_2S_5$, and 1500 ml. toluene was refluxed until the $P_2S_5$ was dissolved—about 4 hours. The mixture was filtered hot and the filtrate evaporated in vacuo, giving 2266 g. of dark amber-colored viscous product having the structure

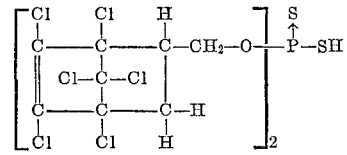

*Analysis.*—Calculated for $C_{16}H_{11}Cl_{12}O_2PS_2$: Cl, 56.47; P, 4.1; S, 8.47. Found: Cl, 55.3; P, 4.05; S, 8.05.

EXAMPLE 3

A mixture of 2648 g. (8 mol) hexachloronorbornenylmethanol and 445 g. (2 mol) $P_2S_5$ in 2 liters of toluene was heated at 100–110° C. for 5 hours, after which time the $P_2S_5$ was dissolved. The solution was cooled, and 392 g. (4 mol) maleic anhydride was added and solution heated at 100–110° C. for 20 hours. The mixture was then cooled and 632 g. (4 mol) of Oxodecyl alcohol was added and resultant mixture heated at 100–110° C. for 20 hours. The mixture was cooled, filtered, and the filtrate evaporated in vacuo, giving 3879 g. of a viscous product having the structure $$\left[\begin{array}{c} \text{Cl} \quad \text{Cl} \quad \text{H} \\ \text{C}\text{---}\text{C}\text{------}\text{C}\text{---}\text{CH}_2\text{---}\text{O} \\ \| \quad \text{Cl}\text{---}\text{C}\text{---}\text{Cl} \\ \text{C}\text{---}\text{---}\text{C}\text{---}\text{---}\text{C}\text{---}\text{H} \\ \text{Cl} \quad \text{Cl} \quad \text{H} \end{array}\right]_2 \begin{array}{c} \text{S} \\ \uparrow \\ \text{P}\text{---}\text{S}\text{---}\text{CH}\text{---}\text{COOH} \\ | \\ \text{CH}_2\text{---}\text{COOC}_{10}\text{H}_{21} \end{array}$$

*Analysis.*—Calculated for $C_{30}H_{35}Cl_{12}PS_2O_6$: Cl, 42.1; P, 3.06; S, 6.32. Found: Cl, 42.8; P, 2.98; S, 6.2.

A transaxle fluid consisting of the above described ATF lubricant and 6% of the product of this example passed the oven oxidation stability test. In the SAE E.P. Test the transaxle fluid carried a load of 420 lbs.; whereas the ATF lubricant failed at 90 lbs.

Full scale passenger car road tests, with car equipped with automatic type transaxle unit, to measure differential hypoid gear tooth surface distress were used to evaluate the transaxle fluid of this example. This fluid passed the High-Speed Tempest differential gear test (developed by General Motors); and also passed the CRC L–39 test for the oxidation resistance and thermal stability of power transmission fluids.

EXAMPLE 4

A mixture of 662 g. (2 mol) ox hexachloronorbornenylmethanol and 111.5 g. (0.5 mol) $P_2S_5$ in one liter of toluene was heated at refluxing temperature for 2 hours, at which time all of the $P_2S_5$ was dissolved. The mixture was cooled, and 98 g. (1 mol) maleic anhydride was added. The resultant mixture was refluxed for 18 hours and cooled. 130 g. (1 mol) iso-octyl alcohol was added to the cooled mixture, and then heated to refluxing temperature and held for 18 hours. The mixture was then cooled and filtered. The filtrate evaporated in vacuo giving 965 g. of dark viscous product having the structure $$\left[\begin{array}{c} \text{Cl} \quad \text{Cl} \quad \text{H} \\ \text{C}\text{---}\text{C}\text{------}\text{C}\text{---}\text{CH}_2\text{---}\text{O} \\ \| \quad \text{Cl}\text{---}\text{C}\text{---}\text{Cl} \\ \text{C}\text{---}\text{---}\text{C}\text{---}\text{---}\text{C}\text{---}\text{H} \\ \text{Cl} \quad \text{Cl} \quad \text{H} \end{array}\right]_2 \begin{array}{c} \text{S} \\ \uparrow \\ \text{P}\text{---}\text{S}\text{---}\text{CH}\text{---}\text{COOH} \\ | \\ \text{CH}_2\text{---}\text{COOC}_8\text{H}_{17} \end{array}$$

*Analysis.*—Calculated for $C_{28}H_{31}Cl_{12}PS_2O_6$: Cl, 43.6; P, 3.15; S, 6.51. Found: Cl, 43.5; P, 3.04; S, 5.75.

A solution of 10% of the product in the ATF lubricant gave a transaxle fluid that passed the SAE E.P. Test at 550 lbs. The fluid produced by dissolving 6% of the product in the ATF lubricant passed the SAE E.P. Test at 430 lbs. Both the 6 and 10% fluids passed the oven oxidation stability test.

EXAMPLE 5

A mixture of 378 g. (0.5 mol) of the acid of Ex. 2 and 34 g. (0.25 mol) limonene in 300 ml. toluene was heated at refluxing temperature for about 18 hours and cooled. The cooled mixture was evaporated in vacuo, giving 410 g. of dark viscous product having the structure corresponding to Formula A(b) hereinbefore set forth.

*Analysis.*—Calculated for $C_{42}H_{38}Cl_{24}P_2S_4O_4$: Cl, 51.7; P, 3.77; S, 7.78. Found: Cl, 54.4; P, 3.63; S, 7.40.

A 6% solution of the product in the ATF lubricant formed a transaxle fluid that passed the oven oxidation stability test and the SAE E.P. Test at 500 lbs.

EXAMPLE 6

A mixture of 1365 g. (5 mol) hexachlorocyclopentadiene and 550 ml. (374 g., 5.5 mol) isoprene was heated to 100° C. and held for 16 hours. The product was distilled in vacuo, giving 932 g. of an adduct boiling at 125–128° C. at 2 mm. and an $N_D^{20}$ of 1.5529. Thereafter, 171 g. (0.5 mol) of the adduct was slowly added to a solution of 378 g. (0.5 mol) of the acid of Ex. 2 in 300 ml. toluene. The resultant mixture was heated to refluxing temperature and held for 18 hours, then distilled in vacuo giving 528 g. of viscous product having the structure corresponding to Formula A(c) hereinbefore set forth.

*Analysis.*—Calculated for $C_{26}H_{19}Cl_{18}PS_2O_2$: Cl, 58.2; P, 2.82; S, 5.83. Found: Cl, 58.6; P, 3.09; S, 6.23.

The addition of 6% of the product in the ATF lubricant formed a transaxle fluid that passed the oven oxidation stability test and the SAE E.P. Test at 440 lbs.

EXAMPLE 7

A mixture of 378 g. (0.5 mol) of the acid of Ex. 2 and 52 g. (0.5 mol) styrene was heated at refluxing temperature for 19 hours, cooled and filtered. The filtrate was distilled in vacuo giving 425 g. of dark viscous product having the structure corresponding to Formula A(d) above.

*Analysis.*—Calculated for $C_{24}H_{18}Cl_2PS_2O_2$: Cl, 49.6; P, 3.62; S, 7.46. Found: Cl, 50.9; P, 3.34; S, 7.33.

The transaxle fluid formed by the addition of 6% of the above product to the ATF lubricant passed the oven oxidation stability test and the SAE E.P. Test at 305 lbs.

EXAMPLE 8

To a solution of 378 g. (0.5 mol) of the acid of Ex. 2 and 205 g. (0.5 mol) di-(Oxodecyl) phosphorodithioic acid in one liter toluene was added 57 g. (0.7 mol) zinc oxide and 10 ml. water. The resultant mixture was heated at refluxing temperature for 16 hours. The hot mixture was filtered hot thru Celite. Distillation of the filtrate in vacuo gave 562 g. of viscous zinc salt correspond to Formula A(e) above wherein R is decyl.

*Analysis.*—Calculated for $C_{36}H_{52}Cl_{12}O_4P_2S_4Zn$: Cl, 34.63; P, 5.04; S, 10.41; Zn 5.32. Found: Cl, 33.6; P, 4.75; S, 10.2; Zn 5.33.

The transaxle fluid formed by dissolving 6% of the zinc salt in the ATF lubricant passed the oven oxidation stability test, the SAE E.P. Test at 310 lbs., and the Corvair Double Bump Test. The term "Oxodecyl" as used herein means the decyl alcohol mixture produced by the Oxo process.

EXAMPLE 9

A mixture of 662 g. (2 mol) hexachloronobornenylmehanol, 316 g. (2 mol) Oxodecyl alcohol and 222.5 g. (1 mol) $P_2S_5$ in one liter toluene was heated at refluxing temperature for 4 hours at which time all of the $P_2S_5$ was dissolved. The mixture was filtered and filtrate evaporated in vacuo giving the mixed monodecyl monohexachloronorbornenylmethyl dithiophosphoric acid. To 583 g. (1 mole) of this mixed dithiophosphoric acid in 500 ml. was added 98 g. (1 mol) maleic anhydride and the mixture refluxed for 18 hours and cooled. There was then added to the cool mixture 40 ml. water. The resultant mixture was then refluxed 3 hours, cooled, filtered, and evaporated in vacuo, giving 652 g. of dark viscous product having the structure corresponding to Formula B above wherein R is decyl.

*Analysis.*—Calculated for $C_{22}H_{31}Cl_6PS_2O_6$: Cl, 30.4; P, 4.42; S, 9.13. Found: Cl, 32.1; P, 4.08; S, 8.55.

The 6% solution of this product in the ATF lubricant passed the oven oxidation stability test and the SAE E.P. Test at 340 lbs. A transaxle fluid formed by dissolving 1.61% of the product in the ATF lubricant passed the Corvair Double Bump Test.

EXAMPLE 10

To a solution of 583 g. (1 mol) of the mixed dithiophosphoric acid of Ex. 9 in one liter toluene there was added 57 g. (0.7 mol) zinc oxide and 10 ml. water. The mixture was refluxed for 16 hours, filtered hot, and evaporated in vacuo giving 566 g. of the viscous liquid zinc salt having the structure corresponding to Formula C above.

*Analysis.*—Calculated for $C_{36}H_{52}Cl_{12}O_4P_2S_4Zn$: Cl, 34.63; P, 5.04; S, 10.41; Zn, 5.32. Found: Cl, 34.5; P, 4.73; S, 10.41; Zn, 5.07.

A 6% solution of the zinc salt in the ATF lubricant passed the oven oxidation stability test and the SAE E.P. Test at 295 lbs.

EXAMPLE 11

A mixture of 180.5 g. (0.5 mol) of commercial hexachloronorbornenyldimethanol (adduct of 2-butene-1,4-diol and hexachlorocyclopentadiene), 56 g. (0.25 mol) $P_2S_5$ and 600 ml. xylene was heated to reflux and held for one hour when all of the $P_2S_5$ was dissolved to form the corresponding $C_9H_6Cl_6PSSH$ acid. The solution was cooled, 49 g. (0.5 mol) maleic anhydride added, and mixture heated and refluxed for 19 hours, cooled, filtered, and filtrate evaporated in vacuo, giving the anhydride corresponding to Formula D(a) above.

*Analysis.*—Calculated for $C_{13}H_9Cl_6PS_2O_5$: Cl, 38.5; P, 5.61; S, 11.6. Found: Cl, 37.8; P, 5.4; S, 10.4.

A 3% solution of the anhydride in the ATF lubricant passed the oven oxidation stability test and the SAE E.P. Test at 325 lbs.

EXAMPLE 12

A solution of 138 g. (0.25 mol) of the anhydride of Ex. 11 in 300 ml. xylene was refluxed with 32.5 g. (0.25 mol) of Oxo-octyl alcohol for 20 hours. The solution was cooled, filtered, and filtrate evaporated in vacuo giving 134 g. brownish-black tacky product having the structure corresponding to Formula D(b) above wherein R is octyl.

*Analysis.*—Calculated for $C_{21}H_{27}Cl_6PS_2O_6$: Cl, 31.4; P, 4.54; S, 9.37. Found: Cl, 30.2; P, 4.05; S, 7.49.

A 6% solution of the product in the ATF lubricant passed the SAE E.P. Test at 350 lbs. load and the oven oxidation stability test.

EXAMPLE 13

A mixture of 273 g. (0.6 mol) of $C_9H_6Cl_6PSSH$ acid (prepared as in Ex. 10), 246 g. (0.6 mol) of didecyldithiophosphoric acid $(C_{10}H_{21}O)_2$-PSSH), 800 ml. toluene, 82 g. (1 mol) zinc oxide, and 25 ml. water was refluxed for 16 hours. The hot mixture was filtered thru Celite, filtrate evaporated in vacuo, giving 498 g. of a dark, brittle, tacky zinc salt having the structure corresponding to Formula D(c) above wherein R is decyl.

The transaxle fluid formed by dissolving 6% of this zinc salt in the ATF lubricant passed the SAE E.P. Test at 350 lbs. load, and the oven oxidation stability test.

The above examples demonstrate that the new class of phosphorus derivatives described herein are effective extreme pressure agents. Further, that transaxle fluids suitable for use as a single lubricant in automatic type transaxle units can be simply produced by the simple addition of a member of the new class of compounds of the invention to an automatic transmission fluid.

Unless otherwise stated, percentages given herein and in the claims are weight percentages.

Thus, having described the invention, the invention claimed is:

1. A transaxle fluid consisting essentially of a petroleum base automatic transmission fluid and about 0.1–10% of an oil-soluble dithiophosphoric acid derivative of the group consisting of compounds represented by formulas:

(A)
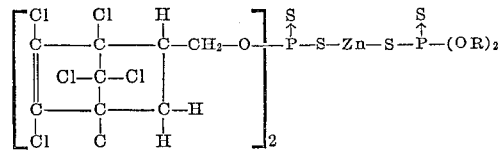

(B)
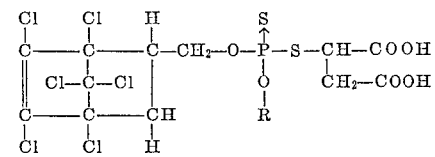

and (C)
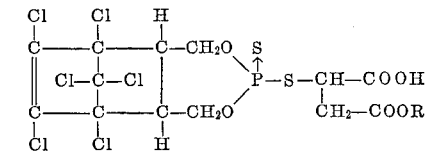

wherein R in each instance is alkyl of 6 to 20 carbon atoms.

2. A transaxle fluid consisting essentially of a petroleum base automatic transmission fluid and about 0.1–10% of the compound having the formula

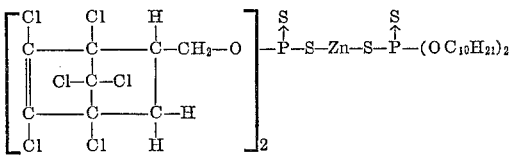

3. A transaxle fluid consisting essentially of a petroleum base automatic transmission fluid and about 0.1–10% of the compound having the formula

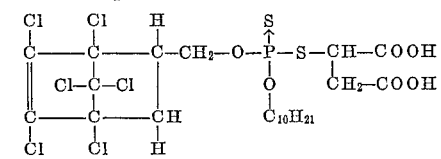

4. A transaxle fluid consisting essentially of a petroleum base automatic transmission fluid and about 0.1–10% of the compound having the formula

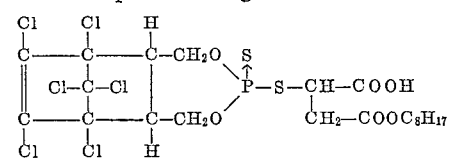

References Cited

UNITED STATES PATENTS 2,881,196    4/1959    Fields _____ 260—429.9

LEON D. ROSDOL, *Primary Examiner.*

STANLEY D. SCHWARTZ, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,403,105            September 24, 1968

Joseph M. Sandri

It is certified that error appears in the above identified patent and that said Letters Patent are hereby corrected as shown below:

Column 5, line 27, "ox" should read -- of --. Column 6, line 46, "mehanol" should read -- methanol --; line 53, after "ml." insert -- toluene --.

Signed and sealed this 10th day of February 1970.

(SEAL)
Attest:

Edward M. Fletcher, Jr.           WILLIAM E. SCHUYLER, JR.
Attesting Officer                  Commissioner of Patents